United States Patent [19]
Costa

[11] Patent Number: 5,476,358
[45] Date of Patent: Dec. 19, 1995

[54] THREE-AXIS CARTESIAN ROBOT

[76] Inventor: Larry J. Costa, 3138 Woodland Trace, Danville, Ill. 61832

[21] Appl. No.: 343,136

[22] Filed: Nov. 22, 1994

Related U.S. Application Data

[63] Continuation of Ser. No. 887,317, May 22, 1992, abandoned.

[51] Int. Cl.$^6$ ........................................................ B25J 5/04
[52] U.S. Cl. ............................... 414/749; 901/21; 901/26; 901/16; 74/490.04
[58] Field of Search ..................................... 414/749, 751, 414/752, 753; 901/21, 26, 16; 74/89.2, 89.21, 89.13, 490.04

[56] References Cited

U.S. PATENT DOCUMENTS

| | | |
|---|---|---|
| 465,109 | 12/1891 | Dixon . |
| 3,344,933 | 10/1967 | Jelatis et al. ............................... 212/24 |
| 4,243,147 | 1/1981 | Twitchell et al. ........................ 212/159 |
| 4,417,845 | 11/1983 | Burton ....................................... 414/733 |
| 4,770,598 | 9/1988 | Kotani ....................................... 414/752 |
| 4,820,109 | 4/1989 | Witt ........................................... 414/282 |
| 4,842,476 | 6/1989 | Shiotani ..................................... 414/751 |
| 4,922,173 | 5/1990 | Lawler ..................................... 318/568.2 |
| 5,324,163 | 6/1994 | Costa ......................................... 414/571 |

FOREIGN PATENT DOCUMENTS 151362  5/1904  Germany .

*Primary Examiner*—Donald W. Underwood
*Attorney, Agent, or Firm*—Zarley, McKee, Thomte, Voorhees & Sease; Dennis L. Thomte

[57] ABSTRACT

A three-axis robot is described comprising a first horizontally disposed support having a first carriage selectively movably mounted thereon. A second support is operatively secured to the first carriage and extends transversely from the longitudinal axis of the first support. A second carriage is longitudinally movably mounted on the second support and has a third support selectively vertically movably mounted thereon. Through the use of belts and brakes, the second support may be selectively moved relative to the first support and the third support may be selectively vertically moved relative to the second support. Thus, one axis of drive actuation can provide multiple axes of motion.

2 Claims, 3 Drawing Sheets

THREE-AXIS CARTESIAN ROBOT

This is a continuation of application Ser. No. 07/887,317 filed on May 22, 1992, now abandoned.

BACKGROUND OF THE INVENTION

This invention relates to a Cartesian robot and more particularly to a three-axis Cartesian robot.

Many types of robotic designs have been previously provided but they all suffer from one or more shortcomings. To the best of applicant's knowledge, the prior Cartesian robot devices required one drive motor for each axis of movement.

It is therefore a principal object of the invention to provide a three-axis Cartesian robot design.

Yet another object of the invention is to provide a three-axis Cartesian robot requiring only one axis of drive motion for the three axes of movement.

Still another object of the invention is to provide a three-axis Cartesian robot which is economical to manufacture, durable in use and refined in appearance.

These and other objects will be apparent to those skilled in the art.

SUMMARY OF THE INVENTION

A three-axis Cartesian robot is described which includes a single drive motor for driving the robot in three directions of movement, namely the X, Y and Z axes.

The robot of this invention includes a first horizontally disposed support having a first carriage longitudinally movably mounted thereon. A drive motor is mounted on the first support and is operatively connected to the first carriage for moving the carriage longitudinally therealong. A second support is operatively secured to the first support and extends transversely therefrom adjacent one end thereof. A second carriage is selectively mounted on the second support. A third support is vertically movably mounted on the second carriage and has means at the lower end thereof for manipulating the workpieces. A traverse brake is provided for selectively preventing the movement of the first carriage at time. Similarly, a vertical brake is mounted on the second carriage as is a horizontal brake. Selective actuation of the traverse brake causes the second support to be moved relative to the first support. Selective actuation of the vertical brake causes selective vertical movement of the third support relative to the second carriage. Selective actuation of the horizontal brake causes the selective movement of the second carriage relative to the second support.

The design of the system consists of two or more axes of motion with only a single drive mechanism. Increased safety of this system is provided through the use of the horizontal brake, vertical brake and traverse brake. The robot of this invention is less complicated and is less expensive than the prior art devices.

DESCRIPTION OF THE PREFERRED EMBODIMENT

Figure 1:
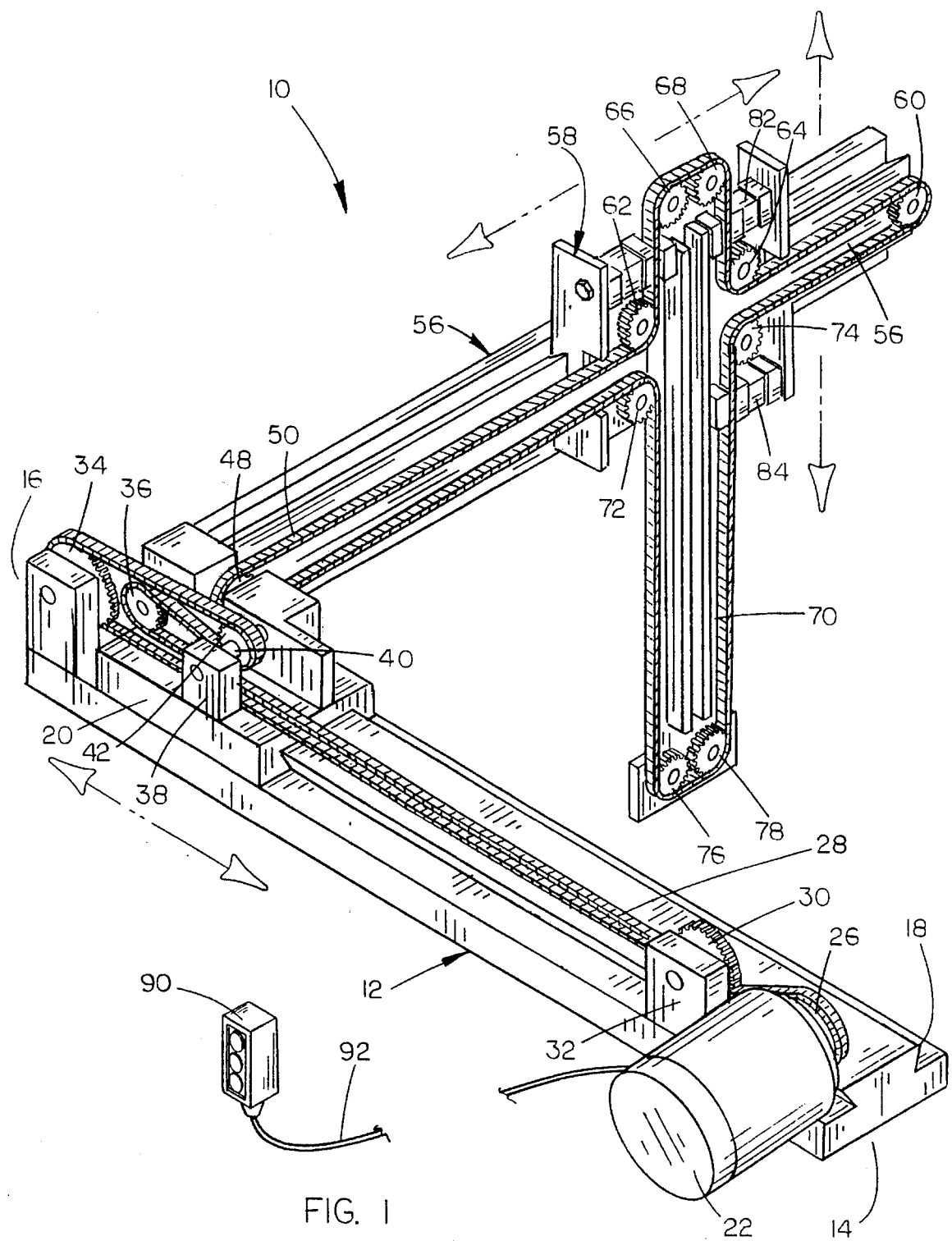
FIG. 1 is a perspective view of the robot of this invention.
Figure 2:
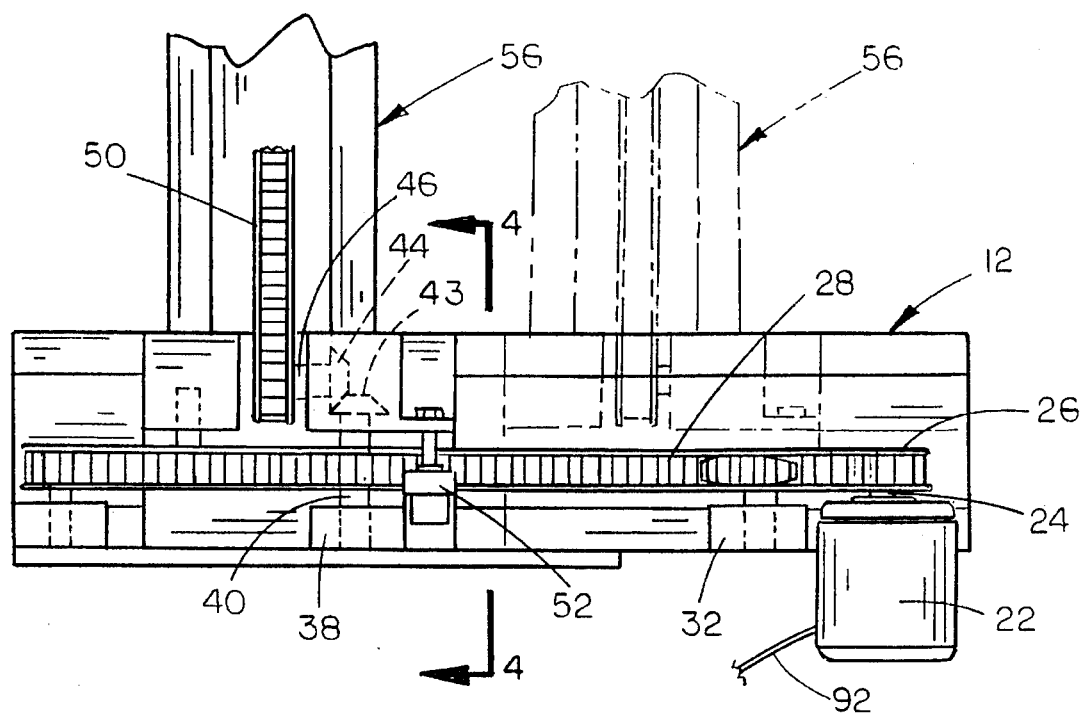
FIG. 2 is a top elevational view of a portion of the robot of this invention.
Figure 3:
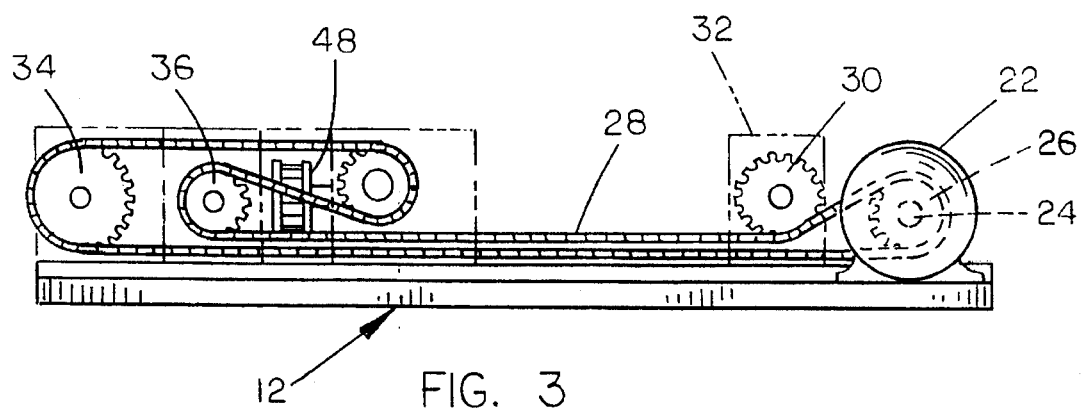
FIG. 3 is a side view of the drive mechanism for the robot of this invention.

Referring to FIG. 1, the numeral 10 refers to the three-axis Cartesian robot of this invention. Robot 10 includes a first support 12 which is horizontally disposed and which has opposite ends 14 and 16. Support 12 includes an upwardly presented dovetail design 18 upon which is movably mounted carriage 20.

Reversible drive motor 22 is mounted on support 12 adjacent end 14 and has a horizontally disposed drive shaft 24 extending therefrom. Sprocket or pulley 26 is mounted on drive shaft 24 and has belt or chain 28 extending therearound. As seen in FIG. 1, pulley 30 is rotatably mounted on bracket 32 and engages the upper portion of belt 28. Idler pulley 34 is rotatably mounted on support 12 adjacent end 16 and has the belt 28 extending therearound as seen in FIG. 1. Idler pulley 36 is also provided and has the belt 28 extending therearound as also seen in FIG. 1. Support 38 is mounted on carriage 20 and has shaft 40 mounted thereon. Pulley 42 is mounted on shaft 40 and also has the belt 28 extending thereon as also best seen in FIG. 1.

The inner end of shaft 40 has a bevel gear 43 mounted thereon which is in mesh with a bevel gear 44 mounted on shaft 46 so as to provide a right angle drive from drive motor 22. Pulley 48 is mounted on shaft 46 and has the belt 50 extending therearound.

Traverse brake 52 is operatively secured to the support means 12 and is interconnected to the block member 54 which is operatively connected to the carriage 20 so that when the brake 52 is actuated, carriage 20 will be pulled laterally towards support 12 to create frictional contact between carriage 20 and dovetail design 18 of support 12 to prevent movement of carriage 20 with respect to support 12.

A horizontally disposed support 56 extends transversely from the end of support 12 and has carriage 58 selectively horizontally movably mounted thereon. Pulley 60 is mounted at the outer end of support 56 and has belt 50 extending thereon as seen in FIG. 1.

Figure 5:
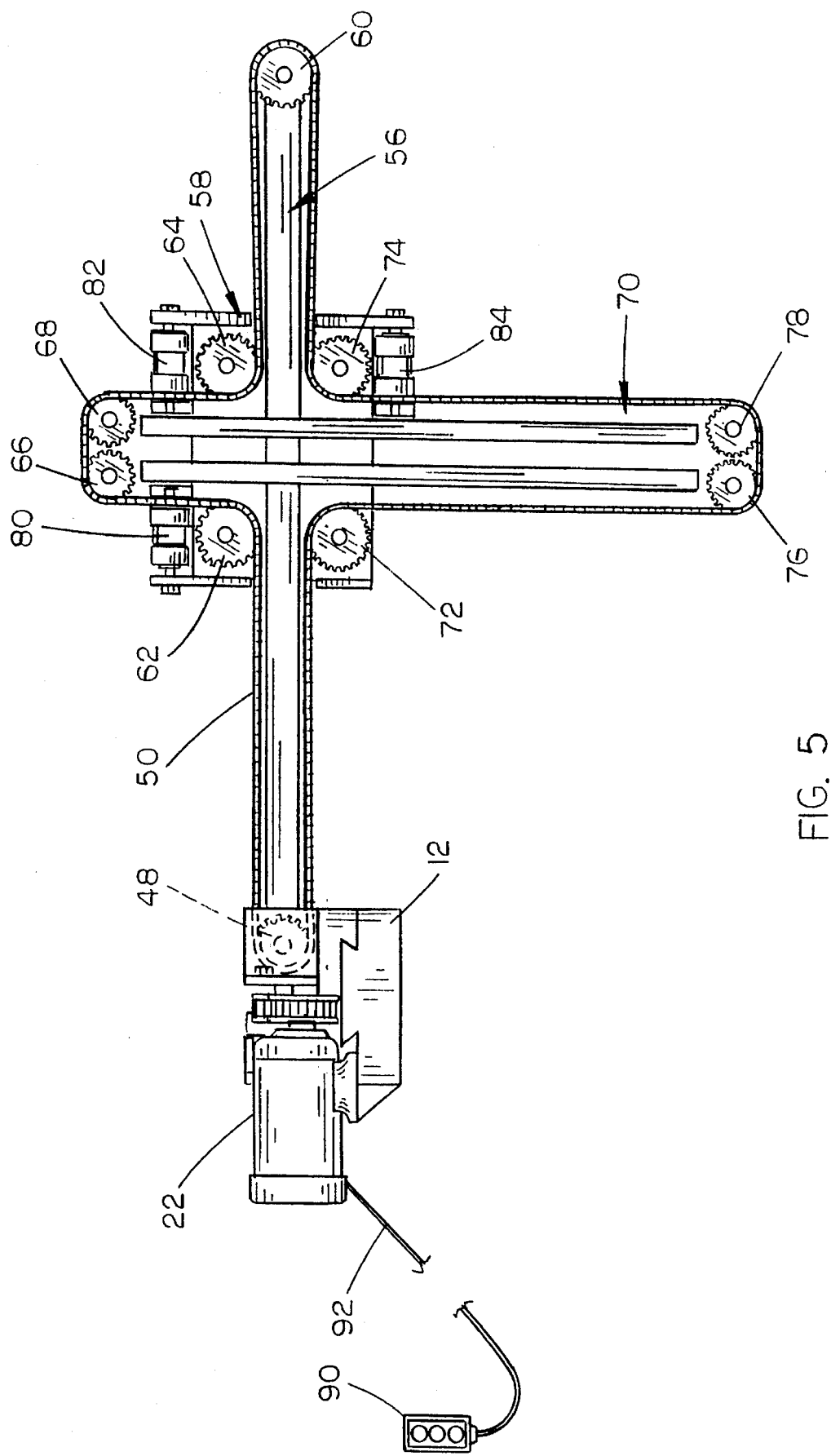
FIG. 5 is a right side view of the invention.

As stated, carriage 58 is horizontally movably mounted on support 56. Carriage pulleys 62 and 64 are rotatably mounted on carriage 58 above the rotational axes of pulleys 48 and 60 and have the belt 50 extending therebeneath and therearound as seen in FIG. 5. Carriage idler pulleys 66 and 68 are rotatably mounted at the upper end of vertically disposed support 70 mounted on carriage 58. Carriage pulleys 72 and 74 are rotatably mounted on the carriage 58 below the rotational axes of pulleys 48 and 60 as seen in FIG. 5 and have the belt 50 extending thereover and therearound as also seen in FIG. 5. Pulleys 76 and 78 are rotatably mounted at the lower end of support 70 and have the belt 50 extending therearound.

Vertical brake 80 is mounted on carriage 58 as seen in FIG. 5 and comprises a hydraulic or pneumatic cylinder adapted to engage belt 50 to prevent movement of belt 50 as required. Anchor brake 82 is mounted on carriage 58 and is comprised of a hydraulic or pneumatic cylinder adapted to engage belt 50 to prevent movement of the belt 50 as required. Similarly, horizontal brake 84 is mounted on carriage 58 and it comprises a hydraulic or pneumatic cylinder arrangement adapted to grasp belt 50 to prevent movement of belt 50 as required. The lower end of support means 70 would include the necessary components positioned thereon to grasp or move the workpieces being manipulated.

In operation, support 56 may be moved longitudinally with respect to support 12 by disengaging traverse brake 52. When motor 22 is rotated in a counterclockwise direction as viewed in FIG. 1, support 56 will be moved towards the right as viewed in FIG. 1. When support 56 has been properly positioned by the motor 22, traverse brake 52 is actuated so that carriage 20 will not be able to move relative to support 12. With carriage 20 locked into position, further rotation of the belt 28 by the motor 22 will simply cause the rotation of pulley 48 in one direction or the other depending upon the direction of rotation of the motor 22.

If it is desired to vertically move support 70 relative to carriage 58, vertical brake 80 is released so that movement of the belt 50 in either direction depending upon the direction of rotation of the motor 22, will cause the support 70 to either move upwardly or downwardly relative to carriage 58. During such movement, the horizontal brake 84 would be engaged.

When it is desired to move the carriage 58 horizontally relatively to support 56, vertical brake 80 is engaged and horizontal brake 84 is disengaged so that movement of the belt 50 in one direction or another depending upon the direction of movement of the motor 22 will cause the carriage 58 to move inwardly or outwardly on the support 56.

Figure 4:
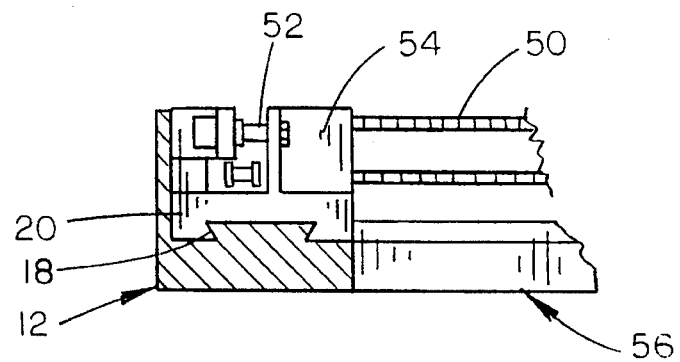
FIG. 4 is a sectional view seen on lines 4—4 of FIG. 2.

A stationary position is held with the anchor brake 82, horizontal brake 84, vertical brake 80 and traverse brake 52 being engaged with the drive motor 22 being held in its holding position. To summarize somewhat, vertical motion of the support 70 is attained by releasing the vertical brake 80 with the drive motor 22 moving the support 70 to the desired position. Horizontal motion of the carriage 58 is attained by releasing the horizontal brake 84 with the drive motor 22 moving the carriage 58 to the desired position. Traverse motion is attained by releasing the traverse brake 52 and the drive motor 22 moving the carriage 20 to the desired position. It should be noted that the structure shown in FIG. 4 in cross-section depicts the side structure for the carriage 12 to cooperate with the brake 52. The side structure and brake 52 are not shown in FIG. 1 to provide a clear view of the drive structure.

Thus it can be seen that a unique three-axis Cartesian arm-type robot has been provided which is driven by a single motor through a unique support, carriage and brake mechanism. The robot of this invention is less costly to manufacture and is much more reliable in operation. Further, the robot of this invention is simplified in construction. Thus it can be seen that the invention accomplishes at least all of its stated objectives.

I claim:

1. A three-axis Cartesian robot, comprising, a first, elongated horizontally disposed support means having first and second ends, a first carriage longitudinally movably mounted on said first support means, a selectively reversible drive motor means mounted on said first end of said first support means and having a horizontally rotatable drive shaft having its axis of rotation disposed transversely to the longitudinal axis of said support means, a first pulley means mounted on said drive shaft, a first idler pulley mounted on said second end of said first support means, an angle drive means mounted on said first carriage, said angle drive means including an input shaft and an output shaft having pulleys mounted thereon, a first belt means extending around and between said first pulley means and said first idler pulley, said first belt means also being operatively connected to said input shaft of said angle drive means, a traverse brake means for selectively preventing longitudinal movement of said first carriage with respect to said first support means;

said drive motor, when driving in a first direction, with said traverse brake means being disengaged, causing said carriage to move towards said first end of said first support means, said drive motor, when driven in a second direction, with said traverse brake means being disengaged, causing said first carriage to move towards said second end of said first support means, said drive motor, when driven in said first or second directions, with said traverse brake means being engaged, causing said input shaft of said angle drive means to be rotated in first and second directions respectively, as second elongated and horizontally disposed support means secured to and extending from said first carriage in a direction transverse to the longitudinal axis of said first support means, said second support means having inner and out ends, a second carriage longitudinally movably mounted on said second support means, a second idler pulley rotatably mounted, about a horizontal axis transverse to the longitudinal axis of said second support means, at the outer end of said second support means, a third vertically disposed support means vertically movably mounted on said second carriage, a second belt means extending around and between the pulley on the said output shaft of said angle drive means and said second idler pulley means, first and second horizontally spaced apart carriage pulleys mounted on said second carriage above the axis of rotation of said second idler pulley, third and fourth, horizontally spaced apart carriage pulleys, mounted on said second carriage below the axis of rotation of said second idler pulley, a first carriage idler pulley means on said third support means above said first and second carriage pulleys, a second carriage idler pulley means on said third support means below said third and fourth carriage pulleys, said second belt means extending from said angle drive output shaft pulley, then beneath said first carriage pulley, thence upwardly therefrom, thence over and around said first carriage idler pulley means, thence downwardly, thence beneath and around said second carriage pulley, thence around said second idler pulley, thence over and around said fourth carriage pulley, thence downwardly, thence around and beneath said second carriage idler pulley means, thence upwardly, then around and over said third carriage idler pulley, thence beneath and around said pulley on said output shaft of said angle drive, a vertical brake means on said second carriage means for selective braking engagement with said second belt means adjacent said first carriage pulley, a horizontal brake means on said second carriage means for selectively braking engagement with said second belt means adjacent said third carriage pulley, the lower end of said third support means adapted to have means operatively connected thereto for manipulation of a workpiece, control means for controlling the operation of said drive motor means, traverse brake, vertical brake and horizontal brake.

2. The robot of claim 1 wherein an anchor brake is mounted on said second carriage means for selective braking engagement with said second belt means.

\* \* \* \* \*